(12) United States Patent
Ramakers et al.

(10) Patent No.: US 8,537,576 B2
(45) Date of Patent: Sep. 17, 2013

(54) GENERATION OF HIGHLY ACCURATE AND HIGHLY DYNAMIC DIRECT CURRENTS FROM A RECTIFIER GROUP AND AN ACTIVE FILTER WHICH IS CONNECTED IN PARALLEL WITH THE LOAD FOR SMOOTHING PURPOSES

(75) Inventors: Heinz Ramakers, Ober-Ramstadt (DE); Horst Welker, Griesheim (DE)

(73) Assignee: GSI Helmholtzzentrum fuer Schwerionenforschung GmbH, Darmstadt (DE)

( * ) Notice: Subject to any disclaimer, the term of this patent is extended or adjusted under 35 U.S.C. 154(b) by 455 days.

(21) Appl. No.: 12/808,021

(22) PCT Filed: Oct. 31, 2008

(86) PCT No.: PCT/EP2008/009187
§ 371 (c)(1),
(2), (4) Date: Jun. 14, 2010

(87) PCT Pub. No.: WO2009/077038
PCT Pub. Date: Jun. 25, 2009

(65) Prior Publication Data
US 2010/0264898 A1 Oct. 21, 2010

(30) Foreign Application Priority Data
Dec. 14, 2007 (DE) .................. 10 2007 060 330

(51) Int. Cl.
*H02M 1/12* (2006.01)
*H02M 1/14* (2006.01)

(52) U.S. Cl.
USPC .......................................................... 363/47

(58) Field of Classification Search
USPC ............................................... 363/39, 44–48
See application file for complete search history.

(56) References Cited

U.S. PATENT DOCUMENTS 5,287,288 A * 2/1994 Brennen et al. .................. 702/58
6,545,887 B2 * 4/2003 Smedley et al. ................ 363/47
(Continued)

FOREIGN PATENT DOCUMENTS
DE 3438921 A1 4/1986
DE 3545770 A1 6/1987

OTHER PUBLICATIONS
Welker et al., Jun. 2007, GSI Report, 2007-1, 71.*
(Continued)

*Primary Examiner* — Jue Zhang
(74) *Attorney, Agent, or Firm* — Leydig, Voit & Mayer, Ltd.

(57) ABSTRACT

A power supply for generating temporally specifiable, open- and closed-loop controlled current paths includes a first controllable rectifier group that includes at least one rectifier having a smoothing inductor at an output. An active filter is connected in parallel to a load, the active filter including a second rectifier group with at least one rectifier and a pulse bridge connected to an output thereof. A second-order low pass filter has a clock inductor, a capacitor, and an RC damping, the clock inductor being connected located at an output of the pulse bridge. A voltage of the at least one rectifier of the first controllable rectifier group and a voltage of the active filter in an open and closed loop is controlled, a first controlled system controlling a current of the at least one rectifier of the first controllable rectifier group of the power supply system in open and closed loop via a first controller by an output-side open- and closed-loop controlled variable, and a second controlled system of a second controller for a load current and a subordinate controller for a load voltage controlling the active filter in open and closed loop using a feedforward control variable.

11 Claims, 6 Drawing Sheets

(56) References Cited

U.S. PATENT DOCUMENTS

| | | | | |
|---|---|---|---|---|
| 6,636,107 | B2 * | 10/2003 | Pelly | 363/47 |
| 6,690,230 | B2 * | 2/2004 | Pelly | 327/552 |
| 7,187,229 | B2 * | 3/2007 | Pelly | 363/47 |
| 7,193,872 | B2 * | 3/2007 | Siri | 363/95 |
| 2007/0109823 | A1 * | 5/2007 | Rastogi et al. | 363/40 |

OTHER PUBLICATIONS

FAIR Baseline Technical Report: General Aspects of Power Converters, XP002517306, Mar. 2006.

Fink et al., New Principle for Power Supplies for Synchrotron Magnets Without Tracking Errors, 2nd European Accelerator Conference, Nice, Jun. 12-16, 1990, pp. 1188-1190, Fig. 1 therein.

Jin et al., Comparison of Series and Shunt Active Filter Approaches for High-Performance Magnet Load Applications, Electrical and Computer Engineering, 1995. Canadian Conference on Montreal, Que., Canada Sep. 5-8, 1995, New York, NY, USA, IEEE, US-ISBN 978-0-7803-2766-5; ISBN 0-7803-2766-7, vol. 2, pp. 862-865, XP010193813.

Volker et al., Power Converters of the Main Dipole and Quadrupole Magnet Strings of the Antiproton Decelerator at CERN, CERN/PS 2000-016 (PO), 7th European Particle, 2000.

Welker et al., Dynamic 11kA Power Converter for Prototype Testing of Superconducting FAIR Magnets, XP002517307, 2007.

Kuang Li et al. "Comparison of four control methods to active power filters applied in accelerator power supplies", Power Electronics Specialists Conference 2004, PESC 04. 2004 IEEE 35th Annual, vol. 1, Digital Object Identifier: 10.1109/PESC.2004.1355850, Publication Year: 2004, pp. 794-799, vol. 1.

Kuang Li et al. "Novel load ripple voltage-controlled parallel DC active power filters for high performance magnet power supplies", Nuclear Science, IEEE Transactions on vol. 53, Issue: 3, Part: 3, Digital Object identifier: 10.1109/TNS.2005,862859, Publication Year: 2006, pp. 1530-1539.

Y. Wang et al. DC-side shunt-active power filter for phase-controlled magnet-load power supplies, Power Electronics, IEEE Transactions on vol. 12, Issue: 5, Digital Object Identifier: 10.1109/63.622993, Publication Year: 1997, pp. 765-771.

* cited by examiner

GENERATION OF HIGHLY ACCURATE AND HIGHLY DYNAMIC DIRECT CURRENTS FROM A RECTIFIER GROUP AND AN ACTIVE FILTER WHICH IS CONNECTED IN PARALLEL WITH THE LOAD FOR SMOOTHING PURPOSES

CROSS REFERENCE TO PRIOR APPLICATION

This is a U.S. national phase application under 35 U.S.C. §371 of International Patent Application No. PCT/EP2008/009187, filed Oct. 31, 2008, and claims benefit of German Patent Application No. 10 2007 060 330.6, filed Dec. 14, 2007, which is incorporated by reference herein. The International Application was published in German on Jun. 25, 2009 as WO 2009/077038 A1 under PCT Article 21(2).

The present invention relates to a power supply for generating temporally specifiable, open- and closed-loop controlled current paths, and to a method for controlling the same in open and closed loops.

BACKGROUND

Power supplies are generally used for the current-specific operation of electrical loads; in particular, a time-dependent current path through a load should be adjustable. Rectifiers offer a reliable and proven approach for supplying large currents. However, they deliver a ripple output voltage and thus a ripple output current.

A very high accuracy of solenoid current is required to supply accelerator magnets in accelerator systems. For this reason, conventional rectifier approaches for supplying power to accelerator magnets provide for LC filters to be used (see, for example, "New Principle for Power Supplies for Synchrotron Magnets Without Tracking Errors" by R. Fink and G. Breitenberger et al., 2nd European Accelerator Conference, Nice, Jun. 12-16, 1990, pp. 1188-1190, FIG. 1 therein). These have poor dynamic properties since, in terms of automatic control engineering, a second order system is created by the filter and the load magnet.

Synchrotron accelerators require ramp-controlled power supplies. The poor dynamic performance and the unavoidable lag errors caused by the requisite PI controller during the current ramps makes the above described, classic rectifier approaches unsuited for these applications.

"New Principle for Power Supplies for Synchrotron Magnets Without Tracking Errors" by R. Fink and G. Breitenberger et al., 2nd European Accelerator Conference, Nice, Jun. 12-16, 1990, pp. 1188-1190 discusses a power supply that is able to make do without a passive LC filter at the output of the rectifier. The power supply is composed of a 12-pulse rectifier, SCR (=silicon controlled rectifier), which handles the bulk of the load current, and a load-parallel active filter, referred to as the parallel injection, PE, which only handles a small portion of the load current, but provides for the accuracy and stability of the load current. However, the method described requires a substantial technical outlay to minimize the losses in the linearly controlled transistor banks. To this end, a complex control is also necessary.

As discussed in "Power Converters of the Main Dipole and Quadropole Magnet Strings of the Antiproton Decelerator at CERN" by F. Volker et al., CERN/PS 2000-016 (PO), 7th European Particle, with respect to its steady-state and dynamic behavior, a phase-controlled thyristor rectifier can be improved for high-precision and rapid-response applications through the use of a parallel, pulse-width controlled active filter. Again, the rectifier handles the bulk of the load current, while the active filter merely handles the harmonic cancellation and current-error compensation, and is only used for a portion of the load current under transient conditions. This leads to a low power rating of the active filter. In this approach, the clock filter at the output of the active filter makes it additionally necessary to have a passive LC filter at the output of the rectifier in order to observe the required accuracy, thereby entailing the above described disadvantages.

SUMMARY

In an embodiment, the present invention provides a power supply for generating temporally specifiable, open- and closed-loop controlled current paths. The power supply includes a first controllable rectifier group that is connectable to an electrical power supply system and includes at least one rectifier having a smoothing inductor at an output. An active filter is connectable to the electrical power supply system and connected in parallel to a load, the active filter including a second rectifier group with at least one rectifier and a pulse bridge connected to an output thereof and having four circuit elements, each circuit element having a corresponding free-wheeling diode that is bypassing and conductive in an opposite direction of a bipolar, clocked current injection. A second-order low pass filter has an inductor, a clock inductor, a capacitor, and an RC damping. The clock inductor is connected at an output of the pulse bridge. A voltage of the at least one rectifier of the first controllable rectifier group and a voltage of the active filter in an open and closed loop is controlled. A first controlled system controls a current of the at least one rectifier of the first controllable rectifier group of the power supply system in open and closed loop via a first controller by an output-side open- and closed-loop controlled variable, and a second controlled system of a second controller for a load current and a subordinate controller for a load voltage controls the active filter in open and closed loop using a feedforward control variable.

BRIEF DESCRIPTION OF THE DRAWINGS

The present invention is explained in greater detail with reference to the following drawings.

DETAILED DESCRIPTION

Figure 1:
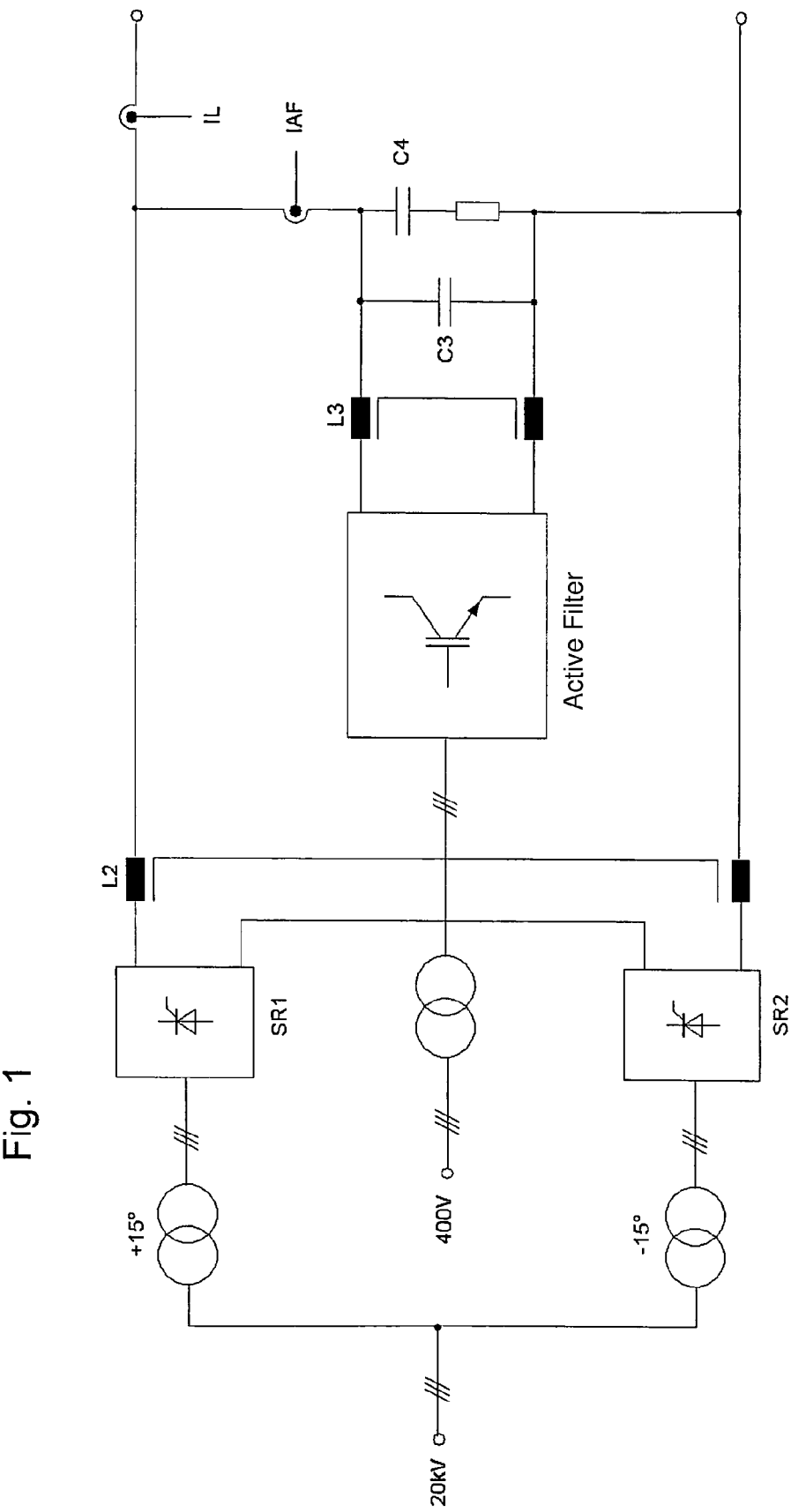
FIG. 1 is a schematic view of a 12-pulse power supply including active filter (serial rectifier)

The present invention provides a power supply having a load-parallel active filter that will enable temporally specifiable current paths to be adjusted with high accuracy, without delay and highly dynamically. At the same time, the present invention keeps the losses in the semiconductors and the outlay for components, as well as the complexity of the open- and closed-loop control to a minimum, and obviates the need for a passive LC filter at the output of the rectifier.

The active filter is composed of its rectifier group and of a pulse bridge connected to the output thereof, composed of four circuit elements V1 through V4, each having a freewheeling diode D1 through D4 that is bypassing and conductive in the opposite direction of the bipolar, clocked current injection. At the output of the pulse bridge is an inductor, clock inductor $L_3$, which, together with a capacitor C2 and an RC damping, R3 and C3, forms a second-order low pass filter.

This design permits a four-quadrant operation—and thus a bipolar output current—of the active filter. The mean value of the output current of the active filter may thereby be regulated to zero. This results in a reduction of the connected load and in the outlay for components. In comparison to a linearly controlled transistor bank, in principle, the described circuit topology exhibits lower losses which, in addition, leads to a size reduction. In comparison to a linear transistor bank, another advantage of this topology is that, by nature, it represents a voltage source that is beneficial to the implementation of the feedback control.

When the mean value of the rectifier voltage likewise corresponds precisely to the value of the load voltage, the rectifier ripple drops completely across smoothing inductor $L_2$; the ripple current resulting therefrom flows over the active filter.

In accordance with an embodiment of the invention, signal $\Delta I_{SR}=(I_{Lsetpoint}-I_{Lactual})-(I_{AFsetpoint}-I_{AFactual})$ is generated to regulate current $I_{SR}$ of the power supply in the first controlled system at the input of controller $F_{RiSR}$ in that the setpoint value of active filter current $I_{AF}$ is subtracted from the setpoint value for load current $I_L$. In the case of a bipolar functioning active filter, this is 0. The setpoint value of the rectifier current is derived therefrom. The actual value of the active filter current is subtracted from the actual value of the load current, and the actual value of the rectifier current is derived therefrom. The resulting system deviation $\Delta I_{SR}$ is fed to controller $F_{RiSR}$. If the current of the active filter deviates from zero, then this system deviation changes and controller $F_{RiSR}$ intervenes until current $I_{AF}$ of the active filter becomes zero. In this manner, on average, the active filter does not supply any current to the load. Thus, the rectifier solely provides the power required on the load side. Only in the case of rapid changes in the current setpoint value, for instance, at the ramp beginning or ramp end, that the rectifier is only able to follow after a delay, does the mean value of the active filter current deviate from zero. To relieve the feedback control of the rectifier, the output signal of controller $F_{RiSR}$ is combined with the signal of the setpoint value of load voltage $U_{setpoint}$.

The power supply may be composed of at least two parallel rectifiers which are each 6-pulse. They may pulse in-phase, so that, at its output, the power supply is likewise 6-pulse. However, they may also pulse mutually out-of-phase, so that a first smoothing of the entire rectifier current is thereby already achieved. It would be technically expedient for pulsing to be carried out symmetrically, i.e., mutually offset by 60°/n, where n is the number of parallel rectifiers, in order to already thereby achieve a greatest possible smoothing effect. From a technical standpoint, it is common for two of the same kind of rectifiers, which are mutually offset by 30°, to be provided. This is achieved via the circuit at the particular input transformer. Two parallel rectifiers pulse mutually in-phase in 6-pulse operation and mutually out-of-phase in 12-pulse operation. Each rectifier of the parallel configuration has its smoothing inductor at the output.

When working with parallel rectifiers, particular attention should be given, most notably in terms of automatic control engineering, to the individual rectifier contribution $I_{SRn}$, and, thus, to a particular current differential $\Delta i_{SRn}$ with respect to total rectifier current $I_{SR}=\Sigma I_{SRn}$.

The power supply may also be composed of at least two serial rectifiers which are each 6-pulse. They may likewise pulse in-phase, so that the power supply is likewise 6-pulse at the output thereof. However, they may likewise pulse mutually out-of-phase, so that a first smoothing of the entire rectifier current is thereby already achieved. It would be technically expedient for pulsing to be carried out preferably symmetrically, i.e., mutually offset by 60°/n, where n is the number of parallel rectifiers, in order to already thereby achieve a greatest possible smoothing effect. From a technical standpoint, it is common for two of the same kind of rectifiers to be provided, which are mutually offset by 30°. Thus, total current $I_{SR}$ of the power supply is equal to individual rectifier current $I_{SRn}$. In this context, there is, however, an output voltage that is composed of the individual rectifier voltages, thus $U_{SR}=\Sigma U_{SRn}$. Taking into account the outlay for insulation, a smoothing inductor for the total power supply may then suffice.

To regulate load current $I_L$, the signal of setpoint value $I_{Lsetpoint}$ and the signal of actual value $I_{Lactual}$ of load current $I_L$ are generated in accordance with $\Delta I_L=I_{Lsetpoint}-I_{Lactual}$ in the second controlled system at the input of controller $F_{RiL}$ for the load current. The output signal of controller $F_{RiL}$ is combined with the signal of setpoint value $U_{setpoint}$ and the signal of actual value $U_{load\,actual}$ of the load voltage and transmitted as an input signal to controller $F_{RuL}$ for the load voltage. Its output signal is combined with the signal of setpoint value $U_{setpoint}$ and a predefined feedforward control signal $U_{SG}$, and the open- and closed-loop controlled variable $U_{controlAF}$ is thereby provided for the active filter. A smooth load voltage $U_L$, which corresponds precisely to the required setpoint value, is impressed at every moment by the feedback control of the active filter. This is accomplished by controller $F_{RuL}$, which is corrected by the output signal of controller $F_{Ri}$. To enhance the precision and dynamic response of controller $F_{RuL}$, it is feedforward-controlled using the setpoint value of the load voltage at the controller output.

To make the bipolar mode of operation possible and obviate the need for a passive LC filter at the rectifier output and, at the same time, to ensure a high precision of the system, it is necessary to eliminate two substantial disturbances which act on the load voltage. This is accomplished by applying feedforward control variable $U_{SG}$, which has the structure $U_{SG}=U_{AF\sim}+U_{VB}$.

The first disturbance is caused by the voltage jumps of the rectifier output voltage. The second-order low pass filter at the output of the pulse bridge (see FIG. 1 through 3) is necessary for smoothing the clock frequency. Together with rectifier inductor $L_2$, the smoothing inductor required for that purpose, clock inductor $L_3$, forms a voltage divider, whereby the jumps of rectifier output voltage $U_{SR\sim}$ are switched through to the load in response to a change in the conductive state of the bridge thyristors in the ratio $L_3/L_2\,U_{SR\sim}$. However, to ensure that the current ripple does not increase in the case of an abrupt change in the rectifier voltage, a feedforward control of the active filter is necessary. For the ripple components of the currents, indicated by "~", it holds that:

$$I_{load\sim}=I_{SR\sim}+I_{AF\sim}.$$

For $I_{AF\sim}=I_{SR\sim}$: it holds that $I_{load\sim}=0$.
Finally, when $U_{AF\sim}=j\omega L_3\,I_{AL\sim}$ and $U_{SR\sim}=j\omega L_2\,I_{SR\sim}$, it holds that:

$$U_{AF\sim}=-L_3/L_2 U_{SR\sim}.$$

This means that, by measuring ripple component $U_{SR\sim}$ of rectifier voltage $U_{SR}$ and ratio $L_3/L_2$, it is possible to calculate the requisite change in ripple component $U_{AF\sim}$ of voltage $U_{AF}$ of the active filter. To make ratio $L_3/L_2$ independent of the non-linear and current-dependent properties of inductors $L_3$ and $L_2$, characteristics $L_3$ as a function of $I_{AF}$ and $L_2$ are additionally stored as a function of $I_{SR}$. $U_{AF\sim}$ forms an additive component of feedforward control variable $U_{SG}$, which, besides being combined with the signal of setpoint voltage $U_{setpoint}$, is combined with the output signal of load voltage regulator $F_{RuL}$.

The second substantial disturbance results from the clock pulse method. The clock control used for the active filter is described in detail in the German Patent DE 34 38 921 C2, in particular column 3, line 51 through column 5, line 40, and illustrated therein in terms of circuit engineering with reference to FIGS. 2 and 3.

This method discusses introducing switch-on delays $t_v$ to avoid short circuits of the bridge circuits. In the case of different signs of load current $I_L$ and output voltage $U_L$, the mean voltage value increases or decreases in a steady-state process by $2t_v/T_s\, U_d$ in comparison to the same signs of current and voltage. $t_v$ is the necessary, above described switch-on delay in the pulse bridge; $T_S$ is the clock pulse period in the pulse bridge; and $U_d$ is the DC link voltage of the active filter. This leads to substantial deviations in output voltage $U_L$ from setpoint value $U_{setpoint}$ in the interval shortly after a change in sign of current $I_{AL}$. In accordance with an embodiment of the invention, this is compensated by voltage regulator $F_{RuL}$ in the second controlled system in that, depending on the conductive state of circuit elements V1 through V4 of the pulse bridge, and, as a function of the sign of current $I_{AL}$ of the active filter and the drive signals for semiconductor circuits V1 through V4, a signal component $U_{corr}=2t_v/T_s*U_d$ is added that is likewise a component of the feedforward control variable of $U_{SG}$. Depending on the conductive state of the elements of the pulse bridge and the direction of current $I_{PE}$, voltage drop $U_T$ across circuit elements V1 through V4 and voltage drop $U_T$) across assigned diodes D1 through D4 are in-phase or in opposite phase to the output voltage. In the bipolar mode of operation, disturbances thereby result during a current zero crossing that must be compensated by the feedback control. When working with very low-inductive loads, problems may thereby arise with respect to the accuracy of the load current. To avoid this, depending on the conductive state of elements V1 through V4 and D1 through D4 of the pulse bridge, an additional feedforward control variable $U_{VB}$ is generated. This variable is a function of the sign of current $I_{AL}$ that is measured over a direct-current transducer, and of the output voltage of the pulse bridge that is derived from the known drive signals for the semiconductor switches.

In accordance certain embodiments, another signal component $U_{VB}$, which has the structure $U_{VB}=+/-U_{corr}+/-U_T+/-U_D$, is added to feedforward control voltage $U_{SG}$, depending on the conductive state of circuit elements V1 through V4 of the pulse bridge, as a function of the sign of current $I_{AF}$ of the active filter and the drive signals for circuit elements V1 through V4. The following Table 1 indicates the values of additional feedforward control variable $U_{VB}$.

|  | only V1 or only V4 | only V2 or only V3 | V1 + V3 or V2 + V4 | V1, V4 | V2, V3 | no IGBT |
|---|---|---|---|---|---|---|
| $I_{PE} > 0$ | $U_{VB} = U_{corr} + U_T + DU$ | $U_{VB} = U_{corr} + 2U_D$ | $U_{VB} = U_{corr} + U_T + U_D$ | $U_{VB} = U_{corr} + 2U_T$ | $U_{VB} = U_{corr} + 2U_D$ | $U_{VB} = U_{corr} + 2U_D$ |
| $I_{PE} < 0$ | $U_{VB} = -U_{corr} - 2U_D$ | $U_{VB} = -U_{corr} - U_T - U_D$ | $U_{VB} = -U_{corr} - U_T - U_D$ | $U_{VB} = -U_{corr} - 2U_D$ | $U_{VB} = -U_{corr} - 2U_T$ | $U_{VB} = -U_{corr} - 2U_D$ |

$U_D$ being the voltage drop across the conductive diode in the form of a reference variable. $U_T$, the voltage drop across the conductive semiconductor switch, for example, an IGBT, is likewise a reference variable.

Output voltage $U_{SR}$ at the rectifier is dependent on open- and closed-loop controlled variable $U_{control\ SR}$ and thus on control angle $\alpha$ which is used to drive the rectifier. Thus, it holds that $U_{d\alpha}=U_{di0}*\cos\alpha$. Therefore, the final controlling element has a non-linear transfer function. If controller $F_{RiSR}$ is to be relieved from the task of compensating for this characteristic, then the linearization in the form of an arcos function is necessary. This measure may be used to select a more favorable controller setting.

In the case of two mutually parallel rectifiers of the power supply, open and closed-loop controlled variable $U_{control\ SR}$ is used directly as open- and closed-loop control signal $U_{control\ SR1}$ for controlling the one rectifier in open and closed loop, and, once combined with current differential signal $\Delta I_{SR}$, it is transmitted to the input of a differential amplifier $F_{R\Delta iSR}$, at whose output, open- and closed-loop signal $U_{control\ SR2}$ is applied for controlling the other, second rectifier in open and closed loop.

In the case of more than two parallel rectifier groups of a power supply, rectifier current $I_{SRn}$ of one group is compared to mean current value $I_{SRmean}=1/n\Sigma I_{SRn}$ of all rectifier groups, and current differential signal $\Delta I_{SR}=I_{SRmean}-I_{SRn}$ is formed. It is combined with the output signal of the linearizer and transmitted as an input signal to n-th current correction controller $F_{R\Delta iSRn}$, at whose output, control signal $U_{controlSRn}$ for the n-th rectifier of the power supply is present.

Likewise, in the case of more than two rectifier groups of the power supply, in accordance with claim 10, a signal is formed from the difference of load current $I_L$ with current $I_{AF}$ of the active filter and divided by number n of rectifiers of the power supply, whereby a calculated mean value $I_{SRcalculated\ mean}$ is provided that is used for generating the particular differential current.

$$\Delta I_{SRn}=I_{SRcalculated\ mean}-I_{SRn}$$

The signal therefrom is then combined with the output signal of the linearizer and transmitted as an input signal to current correction controller $F_{R\Delta iSRn}$, at whose output, open- and closed-loop controlled variable $U_{control\ SRn}$ is present for the n-th rectifier of the power supply.

A protective measure for the power supply may also be present. To this end, the second controlled system for controlling the active filter in open and closed loop is augmented on the output side by a limit value controller $F_{ri\text{-}AFlimit}$ for current $I_{AF}$ of the active filter, whose input signal is the output signal of load voltage regulator $F_{RuL}$ that is combined with the signal of feedforward control voltage $U_{SG}$ and setpoint voltage signal $U_{setpoint}$. This compares the active signal from the measurement of current $I_{AF}$ of the active filter with a predefined and adjustable current limit value $F_{AFlimit}$ and adjusts variable $U_{stAF}$ in such a way that predefined limit value is not exceeded. The active filter protects itself in this manner without generating a fault message. During the time of the control intervention of this controller, it is not possible to observe the current accuracy. However, with correct setpoint values for U and I and intact SVE, this controller should not be used.

Figure 2:
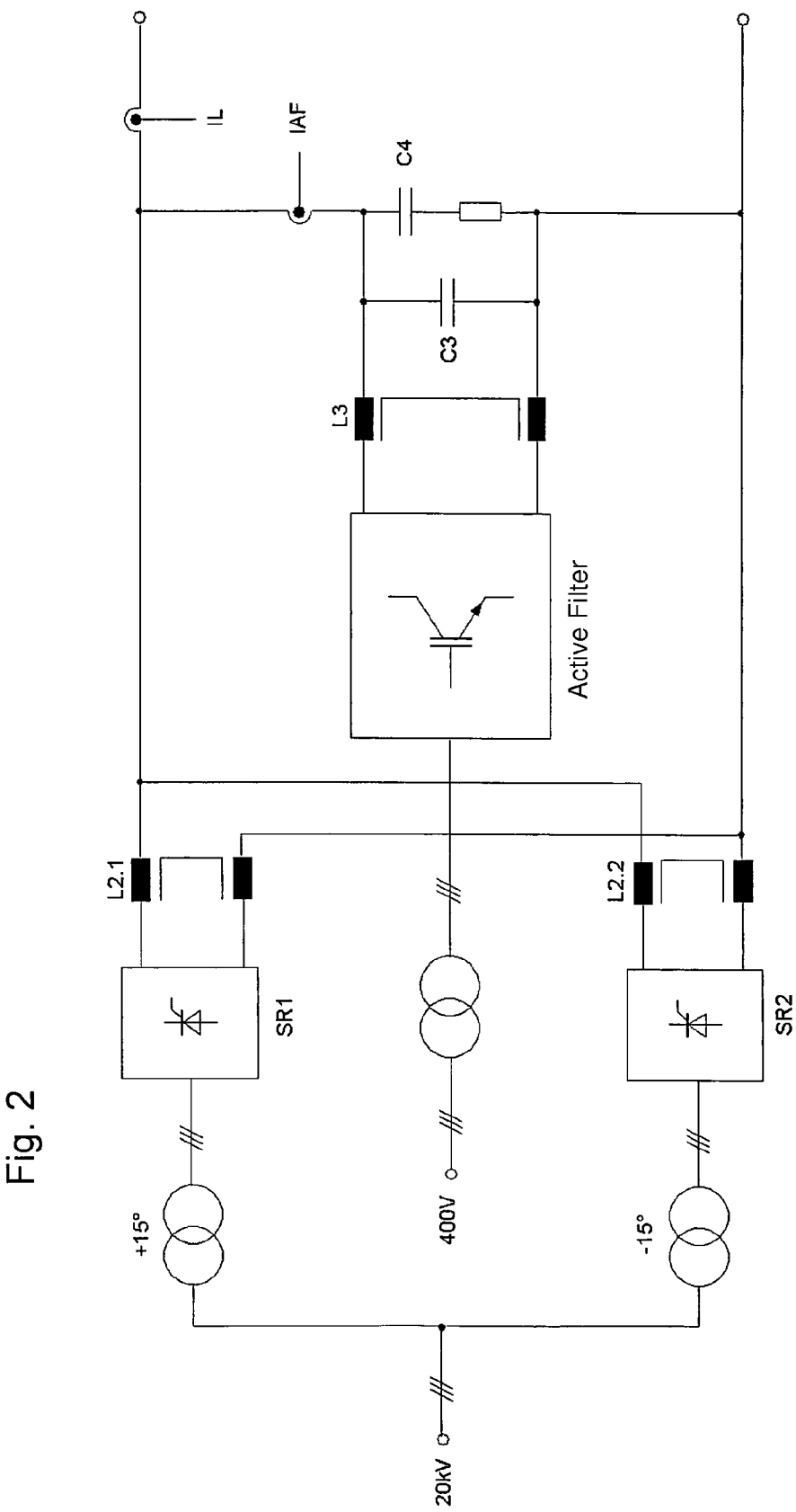
FIG. 2 is a schematic view of a 12-pulse power supply including active filter (parallel rectifier)

A power supply is shown in FIG. 1. It is composed of two mutually series-connected rectifiers SR1 and SR2. Both rectifiers are connected to a first 20 kV power supply system, each via one transformer. Both transformers are electrically rotated by +15° or −15° at the output, so that the two 6-pulse rectifier bridges SR1 and SR2 pulse, mutually offset by 30°, whereby at the output of the power supply from the two serial rectifiers SR1 and SR2, a 12-pulse voltage or a 12-pulse current is present. Due to the series circuit, one and the same current $I_{SR}=I_{SR1}=I_{SR2}$ flows through both rectifiers; thus there is no current differential here. Smoothing inductor L2 for smoothing rectifier current $I_{SR}$ is located directly at the output of the power supply. The output of the power supply including smoothing inductor L2 is closed via active filter AF in parallel to load L. The active filter injection is connected on the input side to a second power supply, in this case the 400 V power supply. Active filter injection AF is composed of a 6-pulse rectifier to whose output the pulse bridge in accordance with FIG. 2 is connected. This is followed by clock inductor $L_3$. The output is closed via the high-pass filter of capacitor $C_3$ and, parallel thereto, the serial branch of capacitor $C_4$ and resistor R4. Together with capacitor $C_2$ and the RC damping by $R_3$ and $C_3$, clock inductor L3 forms a low-pass filter that is tuned to clock pulse period $T_s$. Rectifier current $I_{SR}$ contributes mainly to load current $I_L$; it forms the main portion thereof. Current $I_{AF}$ from the active filter supply is merely still a correction current. Both currents, load current $I_L$ and current $I_{AF}$ from the clocked, bipolar active-filter injection, may be precisely measured in this case, each via one direct current transducer, this only being necessary for load current $I_L$. In the case of current $I_{AF}$ from the active filter injection, the recording, and thus the measurement, via only one, not highly precise Hall generator suffices. Thus, inter alia, an actual signal for controlling the rectifier in open and closed loop and, moreover, for the data processing is generally derived therefrom in each case.

The power supply presented in FIG. 2 differs from FIG. 1 in that, instead of two serial rectifier groups, two parallel rectifier groups are used in FIG. 2. A 12-pulse characteristic is present due to the 30° phase displacement.

Figure 3:
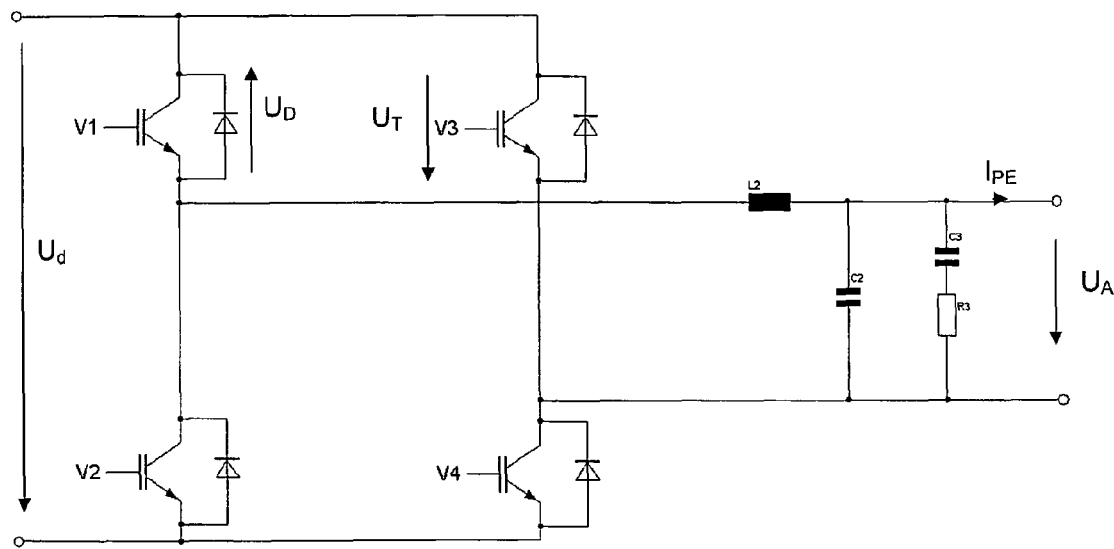
FIG. 3 is a schematic view of a pulse bridge of the bipolar active filter injection.

FIG. 3 shows the pulse bridge as such, at whose input, DC link voltage $U_d$ is present as the output voltage of the 6-pulse rectifier of the active filter injection. The pulse bridge is composed of four semiconductor switches V1 through V4, which, in this case, are IGBTn (Insulated Gate Bipolar Transistors), for example. Each of these semiconductor switches is bridged by a diode that is conductive in the reverse direction of the corresponding semiconductor switch. With respect to the clocking operation of the pulse bridge, reference is made to the German Patent DE 34 38 921 C2 (see above).

The power supply having clocked, bipolar active-filter injection is controlled in open and closed loop via two controlled systems in accordance with FIG. 3. The load current is controlled in open and closed loop via controller $F_{RiSR}$ in the controlled system in the top part of the illustration. To this end, differential signal $\Delta I_L$ is formed from setpoint value $I_{setpoint}$ and actual value $I_{load}$ of load current $I_L$ and combined with differential signal $\Delta I_{AF}=I_{AFsetpoint}-I_{AFactual}$ and transmitted as an input signal to controller $F_{RiSR}$. Its output signal is combined with the setpoint value of load voltage $U_{setpoint}$ and then transmitted as a closed-loop controlled variable $U_{control\ SR}$ to the power supply.

Figure 4:
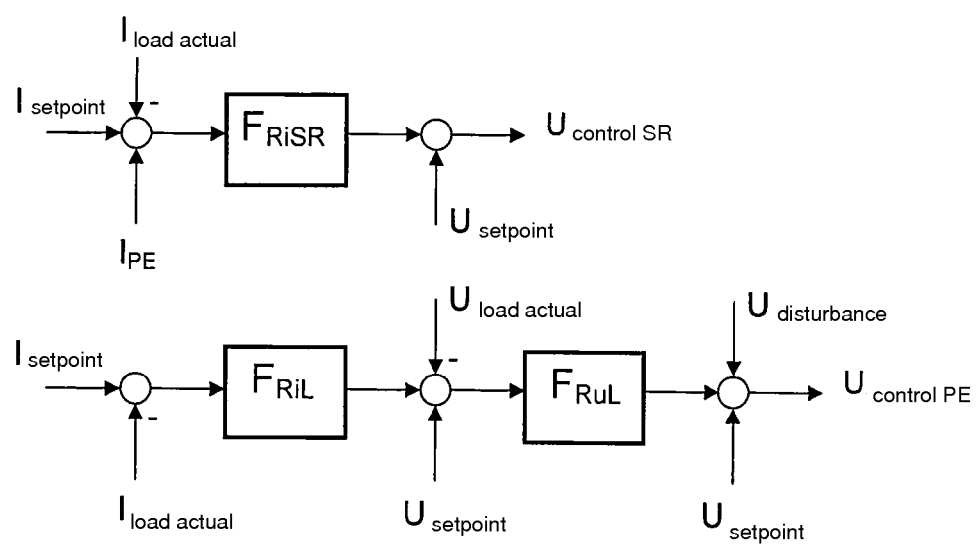
FIG. 4 is a diagrammatic view of a control concept for the power supply having active filter injection.

The second controlled system in the lower part of FIG. 4 is composed of load current regulator $F_{RiL}$ and load voltage regulator $F_{RuL}$. The input signal applied to this second controlled system is the signal derived from the difference of the setpoint value and the actual value of the load current, $\Delta I_L = I_{setpoint}-I_{load\ actual}$. The output signal of load current regulator $F_{RiL}$ is then combined with the difference from the setpoint and actual value of the load voltage, $\Delta U_L = U_{setpoint} - U_{Lactual}$ and transmitted as an input signal to load voltage regulator $F_{RuL}$. The output signal of load voltage regulator $F_{RuL}$ is combined with feedforward control variable $U_{SG}$ and the setpoint value of load voltage $U_{setpoint}$ and then transmitted as controlled variable $U_{control}$ PE to the clocked, bipolar active-filter injection AF.

Figure 5:
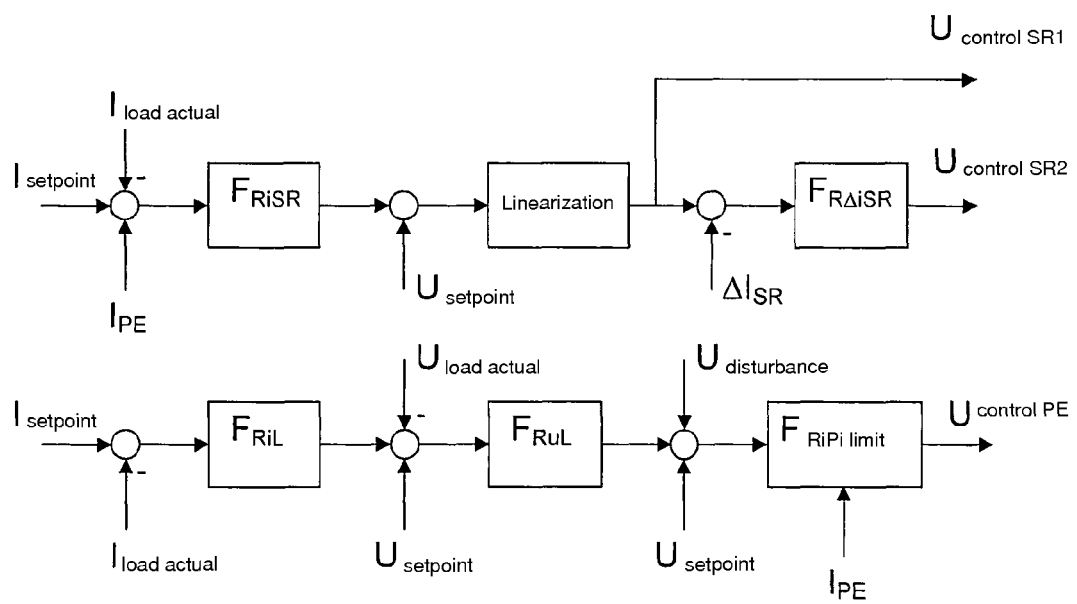
FIG. 5 is a diagrammatic view of a differential current-controlled rectifier control including protection.

FIG. 5 indicates control engineering enhancements, in particular, for a power supply of two mutually parallel rectifiers. Moreover, the controlled system for the clocked, bipolar active-filter injection can be augmented by a protective device in order to limit current $I_{PE}$.

As explained above, the controlled system is augmented by the linearizer to permit selection of a more favorable controller setting. The output signal of the linearizer is used, for example, in the first place directly as a controlled/manipulated variable $U_{control\ SR1}$ of the first rectifier of the power supply. On the other hand, it is combined with differential signal $\Delta I_{SR}=I_{SR1}-I_{SR2}$ and transmitted to the input of the controller for regulating the current differential. Output signal $U_{control\ SR2}$ therefrom is used as the controlled/manipulated variable for the second rectifier of the power supply.

The controlled system for the active filter injection is augmented by protective controller $F_{RiAFlimit}$ in the lower part of the illustration. This compares the active signal from the measurement of current $I^{AF}$ of the active filter with a predefined and adjustable current limit value $F_{AFlimit}$ and adjusts variable $U_{stAF}$ in such a way that predefined limit value is not exceeded. However, as mentioned above, with correct setpoint values for U and I and intact SVE, this controller should not be used.

Figure 6:
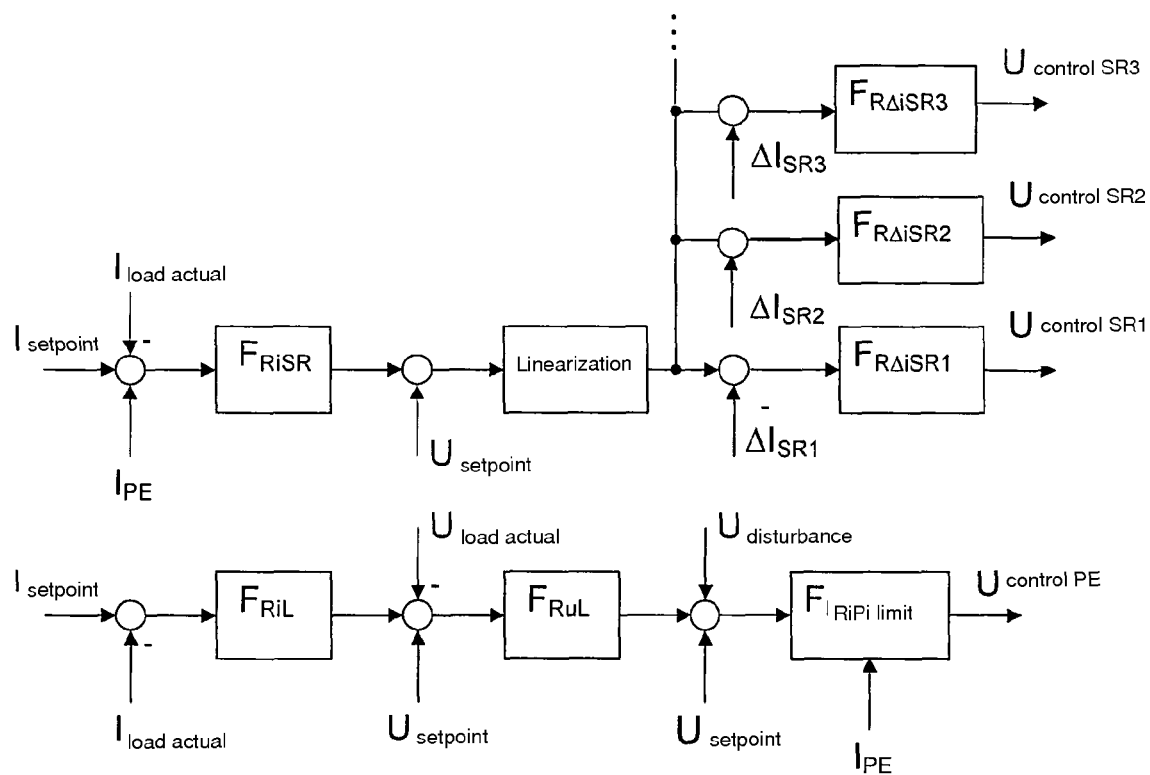
FIG. 6 is a diagrammatic view of a rectifier control when working with more than two parallel rectifiers.

Turning to FIG. 6, the power supply is composed of more than two, namely of n mutually parallel rectifiers, n being a natural number. Each current $I_{SRn}$ is compared to mean current value $I_{SRmean}$ of n rectifiers; i.e., a current differential $\Delta I_{SRn}=I_{SRmean}-I_{SRn}$ is formed which is combined in each case with the output signal of the linearizer and transmitted as an input signal to the individual controller for the current differential regulation $F_{R\Delta iSRn}$, at whose output, controlled variable $U_{control\ SRn}$ is present for controlling the n-th rectifier of the power supply in open and closed loop.

The present invention is not limited to the embodiments described herein; reference should be had to the appended claims.

The invention claimed is:

1. A power supply for generating temporally specifiable, open- and closed-loop controlled current paths, comprising:
   a first controllable rectifier group that is connectable to an electrical power supply system and includes at least one rectifier having a smoothing inductor at an output;
   an active filter connectable to the electrical power supply system and connected in parallel to a load, the active filter including a second rectifier group with at least one rectifier and a pulse bridge connected to an output thereof and having four circuit elements, each circuit element having a corresponding free-wheeling diode that is bypassing and conductive in an opposite direction of a bipolar, clocked current injection; and a second-order low pass filter having a clock inductor, a capacitor, and an RC damping, the clock inductor being connected located at an output of the pulse bridge;

wherein a voltage of the at least one rectifier of the first controllable rectifier group and a voltage of the active filter in an open and closed loop is controlled, a first controlled system controlling a current of the at least one rectifier of the first controllable rectifier group of the power supply system in open and closed loop via a first controller by an output-side open- and closed-loop controlled variable, and a second controlled system of a second controller for a load current and a subordinate controller for a load voltage controlling the active filter in open and closed loop using a feedforward control variable.

2. The power supply as recited in claim 1, wherein the power supply system includes at least two parallel connected, 6-pulse rectifiers configured to pulse mutually in-phase in 6-pulse operation, or mutually out-of-phase in at least 12-pulse operation.

3. The power supply as recited in claim 1, wherein the power supply system includes at least two serially connected 6-pulse rectifiers configured to pulse mutually in-phase in 6-pulse operation, or mutually out-of-phase in at least 12-pulse operation.

4. A method for open- and closed-loop controlling of a power supply having a rectifier and an active filter, via a control system for producing a temporally specified path of load current $I_L$, which is composed of rectifier current $I_{SR}$ and the current of active filter $I_{AF}$ in accordance with $$I_L = I_{SR} + I_{AF},$$

the method comprising:

forming, in a first controlled system of the control system for regulating the current $I_{SR}$ of the rectifier, the signal:

$$\Delta I_{SR} = (I_{Lsetpoint} - I_{Lactual}) - (I_{AFsetpoint} - I_{AFactual})$$

in the first controlled system at the input of the controller $F_{RiSR}$, and combining the output signal at the controller $F_{RiSR}$ with the signal of the setpoint value of the load voltage $U_{setpoint}$, whereby the open- and closed-loop controlled variable $U_{controlSR}$ is provided for controlling the power supply;

generating, in a second controlled system of the control system for regulating the load current $I_L$, the signal of the setpoint value $I_{Lsetpoint}$ and the signal of the actual value $I_{Lactual}$ of the load current $I_L$ in accordance with $\Delta I_L = I_{Lsetpoint} - I_{Lacatual}$ at the input of the controller $F_{RiL}$ for the load current;

combining the output signal of the controller $F_{RiL}$ with the signal of the setpoint value $U_{setpoint}$ and the signal of the actual value $U_{load\ actual}$ of the load voltage and transmitting the output signal as an input signal to the controller $F_{RuL}$ for the load voltage;

combining an output signal of the controller $F_{RuL}$ with the signal of the setpoint value $U_{setpoint}$ and a predefined feedforward control signal $U_{SG}$ so as to provide the open- and closed-loop controlled variable $U_{control\ AF}$ for the active filter; and computing, from the ripple component of rectifier voltage $U_{SR\sim}$ and the value of the smoothing inductor $L_2$ of the rectifier and the value of the smoothing inductor $L_3$ of the active filter, the ripple component of the voltage of the active filter, a signal $U_{AF\sim} = -L_3/L_2\ U_{SR\sim}$, so as to maintain the resulting load voltage smooth and provide a component of the feedforward control signal $U_{disturbance}$.

5. The method as recited in claim 4, further comprising, depending on the conductive state of the circuit elements V1 through V4 of the pulse bridge and, as a function of the sign of the current $I_{AF}$ of the active filter and the drive signals for the semiconductor switches V1 through V4, adding a signal component $U_{corr} = 2t_v/T_s * U_d$ to the feedforward control voltage $U_{SG}$, $T_s$ being the clock pulse period in the pulse bridge and $U_d$ the DC link voltage at the input of the pulse bridge.

6. The method as recited in claim 5, further comprising adding, depending on the conductive state of the circuit elements V1 through V4 of the pulse bridge and, as a function of the sign of the current $I_{AF}$ of the active filter and the drive signals for the semiconductor switches V1 through V4, another signal component $U_{VB}$, which is formed from the voltage drops across the semiconductors, to the feedforward control voltage $U_{SG}$, $U_{VB}$ being formed from $U_{VB} = +/- U_{corr} +/- U_T +/- U_D$.

7. The method as recited in one of claim 4, further comprising linearizing the non-linear response characteristic of the final controlling element $F_{RiSR}$ in a subsequent linearizer.

8. The method as recited in claim 7, further comprising, in the case of two mutually parallel rectifiers of the power supply, using the open- and closed-loop controlled variable $U_{control\ SR}$ directly as an open- and closed-loop controlled variable $U_{control\ SR1}$ for the first rectifier of the power supply and, once combined with a current differential signal $\Delta I_{SR}$, applying the combined signal to the input of a controller $F_{R\Delta iSR}$, at whose output, the open- and closed-loop controlled variable $U_{control\ SR2}$ is provided for the parallel, second rectifier.

9. The method as recited in claim 7, further comprising, in the case of more than two parallel rectifier groups of a power supply, comparing the n-th rectifier current $I_{SRn}$ of the n-th rectifier group to the mean current value $I_{SRmean} = 1/n\Sigma I_{SRn}$ of all rectifier groups; forming the current differential signal $\Delta I_{SRn} = I_{SRmean} - I_{SRn}$, combining the current differential signal with the output signal of the linearizer and transmitting the result as an input signal to the current correction controller $F_{R\Delta iSR}$, at whose output, the open- and closed-loop controlled variable $U_{control\ SRn}$ is provided for the n-th rectifier of the power supply.

10. The method as recited in claim 7, further comprising, in the case of more than two parallel rectifier groups of the power supply, forming a signal from the difference of the load current $I_L$ with the current $I_{AF}$ of the active filter and divided by the number n of the n parallel rectifier groups of the power supply, so as to provide a calculated mean value $I_{SRcalculated\ mean}$ that is used for generating the particular differential current $\Delta I_{SRn} = I_{SRcalculated\ mean} - I_{SRn}$, to be combined with the output signal of the linearizer and transmitted as an input signal to current correction controller $F_{R\Delta iSRn}$, to whose output, the open- and closed-loop controlled variable $U_{control\ SRn}$ is applied for the n-th rectifier group of the power supply.

11. The method as recited in one of claim 7, further comprising augmenting the second controlled system for controlling the active filter in open and closed loop on the output side by a limit value controller $F_{riAFlimit}$ for the current $I_{AF}$ of the active filter, whose input signal is the output signal of load voltage regulator $F_{RuL}$ that is combined with the signal of the feedforward control voltage $U_{SG}$ and the setpoint voltage signal $U_{setpoint}$ and which, together with the signal from the measurement of current $I_{AF}$ of the active filter, limits the current to adjustable values.

* * * * *